United States Patent
Martin et al.

(10) Patent No.: US 10,995,682 B1
(45) Date of Patent: May 4, 2021

(54) SYSTEM AND METHOD FOR REDUCING ENGINE TEMPERATURE

(71) Applicant: Ford Global Technologies, LLC, Dearborn, MI (US)

(72) Inventors: Douglas Raymond Martin, Canton, MI (US); John Eric Rollinger, Troy, MI (US); Julia Helen Buckland Seeds, Commerce Township, MI (US); Joseph Lyle Thomas, Farmington Hills, MI (US); Joshua Schumaker, Dearborn, MI (US); John Erik Mikael Hellstrom, Ann Arbor, MI (US); Adam J. Richards, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 16/675,815

(22) Filed: Nov. 6, 2019

(51) Int. Cl.
| | |
|---|---|
| *F02D 17/02* | (2006.01) |
| *F02D 13/02* | (2006.01) |
| *F02D 41/30* | (2006.01) |
| *F02D 9/02* | (2006.01) |
| *F02D 13/06* | (2006.01) |
| *F02D 41/00* | (2006.01) |

(52) U.S. Cl.
CPC .............. *F02D 17/02* (2013.01); *F02D 9/02* (2013.01); *F02D 13/023* (2013.01); *F02D 13/06* (2013.01); *F02D 17/023* (2013.01); *F02D 41/0087* (2013.01); *F02D 41/3005* (2013.01); F02D 2041/0012 (2013.01); F02D 2200/021 (2013.01)

(58) Field of Classification Search
None
See application file for complete search history.

(56) References Cited

U.S. PATENT DOCUMENTS

| | | | |
|---|---|---|---|
| 5,515,828 A | 5/1996 | Cook et al. | |
| 5,555,871 A * | 9/1996 | Gopp | F02B 75/22 |
| | | | 123/198 D |
| 5,642,717 A * | 7/1997 | Gilman | F02B 77/089 |
| | | | 123/481 |
| 5,724,951 A * | 3/1998 | Mukumoto | F02D 41/1479 |
| | | | 123/481 |
| 6,273,039 B1 | 8/2001 | Church | |
| 6,321,704 B1 | 11/2001 | Church et al. | |
| 6,934,610 B2 * | 8/2005 | Wakashiro | B60W 10/24 |
| | | | 701/22 |
| 7,204,235 B1 * | 4/2007 | Gebby | F02D 17/02 |
| | | | 123/481 |
| 7,458,345 B2 | 12/2008 | Winstead et al. | |
| 7,869,929 B2 | 1/2011 | Sugihara | |
| 8,402,942 B2 * | 3/2013 | Tripathi | F02D 41/0087 |
| | | | 123/350 |

(Continued)

FOREIGN PATENT DOCUMENTS

WO 2017127574 A1 7/2017

*Primary Examiner* — Kevin R Steckbauer
(74) *Attorney, Agent, or Firm* — Geoffrey Brumbaugh; McCoy Russell LLP

(57) ABSTRACT

Systems and methods for cooling an internal combustion engine via flowing air through the internal combustion engine during select conditions are presented. In one example, lift of intake and/or exhaust poppet valves may be adjusted as a function of engine temperature. In addition, opening and closing timings of intake and exhaust poppet valves may be adjusted as a function of engine temperature.

20 Claims, 4 Drawing Sheets

(56) References Cited

U.S. PATENT DOCUMENTS

| | | | |
|---|---|---|---|
| 8,794,213 B2* | 8/2014 | Maehara | F02D 17/02 123/406.46 |
| 9,217,379 B2* | 12/2015 | Willard | F02D 17/04 |
| 9,534,546 B2* | 1/2017 | Nelson | F02D 41/08 |
| 9,702,294 B2* | 7/2017 | Willard | F02D 35/025 |
| 10,087,859 B2* | 10/2018 | Willems | F02D 41/0082 |
| 10,161,325 B2* | 12/2018 | Zur Loye | F02D 41/0245 |
| 10,167,793 B2* | 1/2019 | Bartsch | F01N 13/08 |
| 10,428,725 B2* | 10/2019 | Dudar | F02D 41/086 |
| 10,494,971 B2* | 12/2019 | Younkins | F01N 11/005 |
| 10,626,816 B2* | 4/2020 | Surnilla | F02D 13/0211 |
| 2001/0027760 A1 | 10/2001 | Tanaka et al. | |
| 2002/0115532 A1* | 8/2002 | Wakashiro | B60W 10/06 477/111 |
| 2003/0130090 A1 | 7/2003 | Tanaka et al. | |
| 2007/0079795 A1* | 4/2007 | Gebby | F02D 17/02 123/198 F |
| 2008/0319594 A1* | 12/2008 | Shibata | B60W 20/00 701/22 |
| 2010/0100299 A1* | 4/2010 | Tripathi | F02P 5/1512 701/102 |
| 2011/0239987 A1* | 10/2011 | Maehara | F02D 13/02 123/406.46 |
| 2014/0261315 A1* | 9/2014 | Willard | F02D 41/22 123/349 |
| 2015/0354484 A1* | 12/2015 | Zur Loye | F02D 41/0245 123/481 |
| 2016/0010568 A1* | 1/2016 | Whiston | F02D 13/0207 123/445 |
| 2016/0108794 A1* | 4/2016 | Willard | F02D 13/06 123/294 |
| 2016/0115884 A1* | 4/2016 | VanDerWege | F02P 9/002 123/481 |
| 2016/0195031 A1* | 7/2016 | Willems | F02D 41/0087 123/52.1 |
| 2017/0030279 A1* | 2/2017 | Bartsch | F01N 13/08 |
| 2018/0223757 A1* | 8/2018 | McCarthy, Jr. | F02D 41/0235 |
| 2019/0170052 A1* | 6/2019 | Dudar | F02D 41/047 |
| 2019/0203630 A1* | 7/2019 | Dudar | F02M 26/47 |
| 2019/0285016 A1* | 9/2019 | Surnilla | F02N 19/004 |
| 2019/0338694 A1* | 11/2019 | Dudar | F02D 41/0087 |
| 2019/0353131 A1* | 11/2019 | Hakeem | F02D 41/3094 |

* cited by examiner

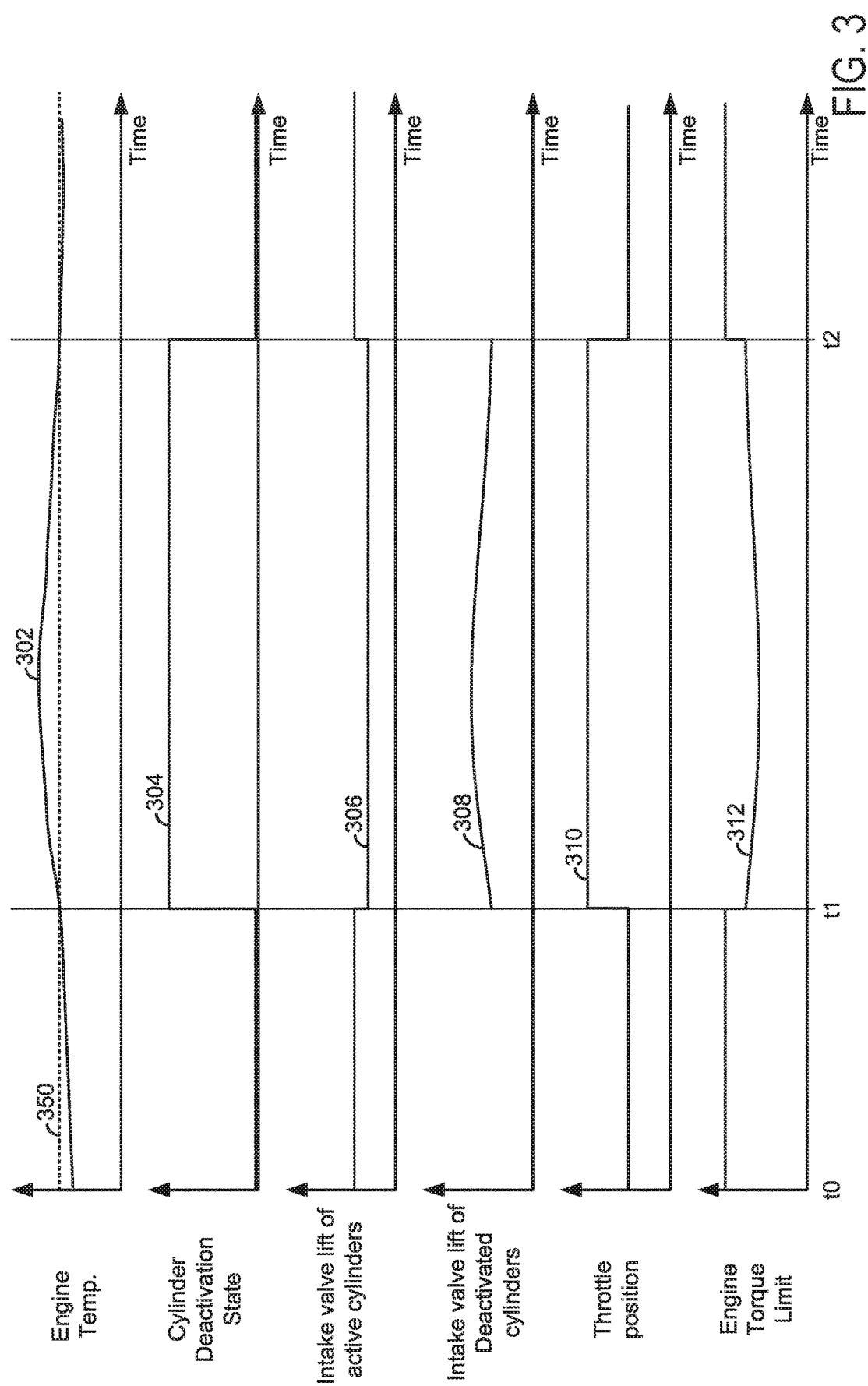

SYSTEM AND METHOD FOR REDUCING ENGINE TEMPERATURE

FIELD

The present description relates to a system and methods for controlling temperature of an internal combustion engine. The system and methods may be applied when liquid engine coolant is insufficient to maintain engine temperature less than a threshold temperature.

BACKGROUND AND SUMMARY

An engine may be cooled via a liquid coolant. The liquid coolant is typically circulated within a coolant system via a pump. The liquid coolant may pass through the engine where it is heated, after being heated the coolant may flow to a radiator where it may be cooled via ambient air. The liquid coolant may be recirculated back to the engine where it may again cool the engine. Under most conditions, the liquid coolant is more than sufficient to cool the engine. However, there may be times when engine cooling via the engine coolant is insufficient to maintain engine temperature to less than a threshold temperature. For example, if the vehicle is driven over an object that pierces the engine coolant system, the liquid coolant may not be retained in the coolant system. In addition, operation of a thermostat within the engine coolant system may degrade over time such that the thermostat restricts coolant flow from the engine. Consequently, engine temperature may rise above a threshold temperature during these conditions. Therefore, it may be desirable to provide a way of cooling an engine during conditions when engine coolant may be insufficient to cool the engine.

The inventors herein have recognized the above-mentioned issues and have developed an engine control method, comprising: deactivating an engine cylinder in response to an engine temperature exceeding a threshold temperature; and adjusting an amount of lift of an intake valve of the engine cylinder in response to the engine temperature exceeding the threshold temperature.

By deactivating one or more cylinders and adjusting an amount of lift of an intake valve in response to an engine temperature exceeding a threshold temperature, it may be possible to provide the technical result of cooling an engine without flowing excessive amounts of air through the engine. In particular, an amount of air that flows through the engine may be adjusted as a function of engine temperature so that air that flows through the engine and reaches a catalyst may be small enough to allow the catalyst to operate at a higher efficiency level. In addition, the deactivated cylinders that air flows through may be changed from engine cycle to engine cycle so that all cylinders are cooled nearly equally, thereby reducing the possibility of localized higher engine temperatures.

The present description may provide several advantages. In particular, the approach may reduce the possibility of an engine temperature exceeding an upper threshold limit. Further, the approach may provide for improved catalyst efficiency when the engine is being cooled via air flowing through the engine. The approach may also adjust timing of deactivated cylinders to control air flow through the engine so that air flow through the engine may be adjusted to suit engine cooling requirements and to improve catalyst efficiency.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where:

FIG. 3 is plot of an example engine operating sequence according to the method of FIG. 4.

DETAILED DESCRIPTION

Figure 1:
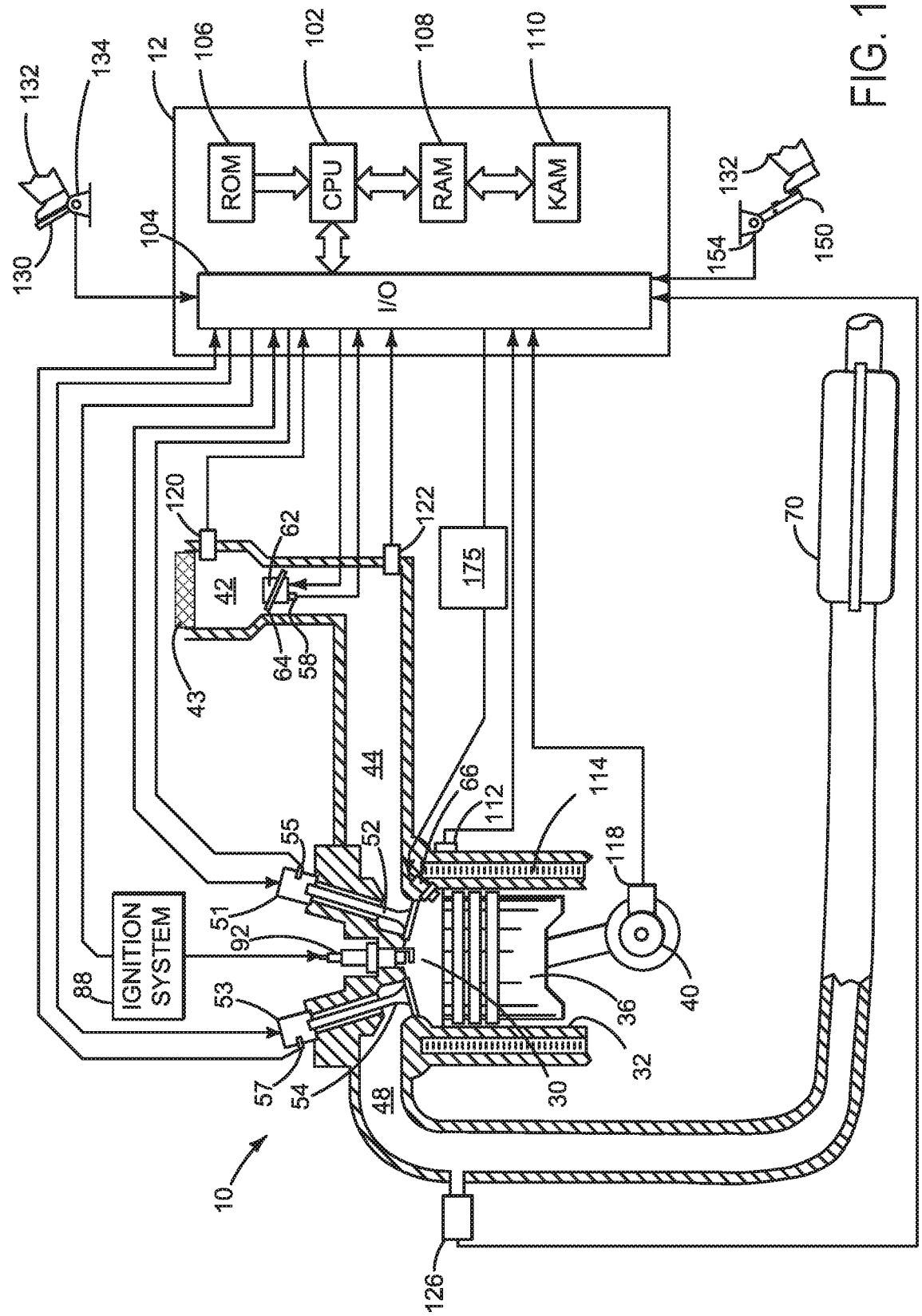
FIG. 1 is a schematic diagram of an engine.
Figure 2A:
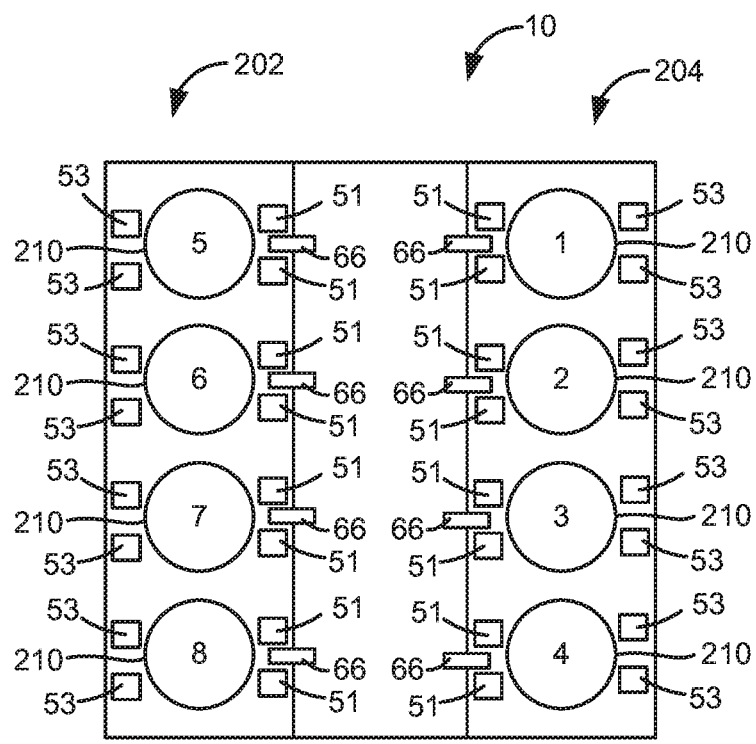
FIG. 2A is a schematic diagram of an eight cylinder engine with two cylinder banks.
Figure 2B:
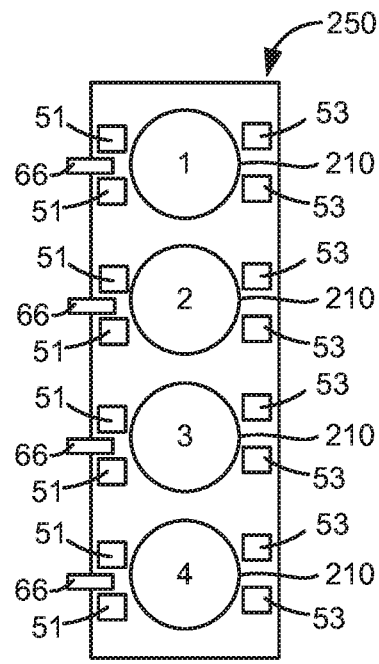
FIG. 2B is a schematic diagram of a four cylinder engine with a single cylinder bank.
Figure 4:
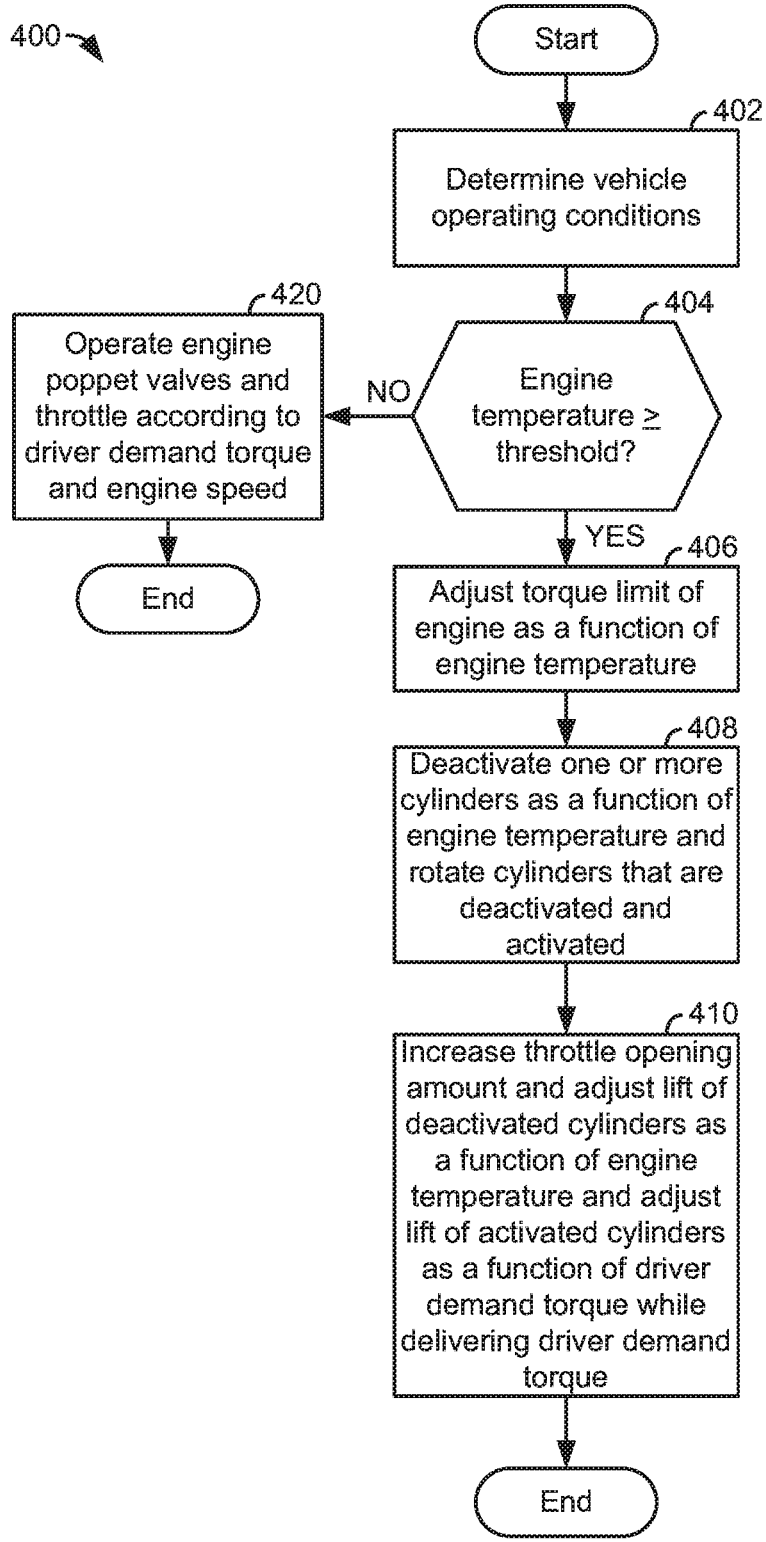
FIG. 4 shows a flow chart of an example method for operating an engine.

The present description is related to cooling an engine via flowing air through the engine without the air participating in combustion. The air that flows through the engine may carry heat from the engine out the engine's exhaust system, thereby cooling the engine. The approach also includes adjusting the amount of air that flows through the engine via adjusting engine valve lift and/or timing. The amount of air flowing through the engine may be based on the temperature of the engine so that if engine temperature is only slightly higher than is expected, the air flow amount through the engine may be small. The smaller air flow amount may help to keep the catalyst operating at a higher level of efficiency. FIG. 1 shows a schematic view of an example engine. FIGS. 2A and 2B show two example configurations of the engine that is shown in FIG. 1. FIG. 3 shows an engine operating sequence according to the method of FIG. 4. A method for operating an engine with variable valve lift to provide engine cooling is shown in FIG. 4.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40.

Combustion chamber 30 is shown communicating with intake manifold 44 and exhaust manifold 48 via respective intake valve 52 and exhaust valve 54. Each intake and exhaust valve may be operated by a variable intake valve operator 51 and a variable exhaust valve operator 53, which may be actuated mechanically, electrically, hydraulically, or by a combination of the same. For example, the valve actuators may be of the type described in U.S. Pat. Nos. 6,321,704; 6,273,039; 7,869,929 and 7,458,345, which are hereby fully incorporated for all intents and purposes. Intake valve operator 51 and an exhaust valve operator 53 may open intake 52 and exhaust 54 valves synchronously or asynchronously with crankshaft 40. The position of intake valve 52 may be determined by intake valve position sensor 55. The position of exhaust valve 54 may be determined by exhaust valve position sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal from controller 12. Fuel is delivered to fuel injector 66 by a fuel system 175. In one example, a high pressure, dual stage, fuel system may be used to generate higher fuel pressures. In addition, intake manifold 44 is shown communicating with optional electronic throttle 62 (e.g., a butterfly valve) which adjusts a position of throttle plate 64 to control air flow from air filter 43 and air intake 42 to intake manifold 44. Throttle 62 regulates air flow from air filter 43 in engine air intake 42 to intake manifold 44. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by human driver 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; brake pedal position from brake pedal position sensor 154 when human driver 132 applies brake pedal 150; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Referring now to FIG. 2A, an example multi-cylinder engine that includes two cylinder banks is shown. The engine includes cylinders and associated components as shown in FIG. 1. Engine 10 includes eight cylinders 210. Each of the eight cylinders is numbered and the numbers of the cylinders are included within the cylinders. Fuel injectors 66 selectively supply fuel to each of the cylinders that are activated (e.g., combusting fuel during a cycle of the engine). Cylinders 1-8 may be selectively deactivated to improve engine fuel economy when less than the engine's full torque capacity is requested. For example, cylinders 2, 3, 5, and 8 (e.g., a fixed pattern of deactivated cylinders) may be deactivated during an engine cycle (e.g., two revolutions for a four stroke engine) and may be deactivated for a plurality of engine cycles while engine speed and load are constant or vary slightly. During a different engine cycle, a second fixed pattern of cylinders 1, 4, 6, and 7 may be deactivated. Further, other patterns of cylinders may be selectively deactivated based on vehicle operating conditions. Additionally, engine cylinders may be deactivated such that a fixed pattern of cylinders is not deactivated over a plurality of engine cycles. Rather, cylinders that are deactivated may change from one engine cycle to the next engine cycle. For example, during a first engine cycle, cylinders 1, 4, 6, and 7 may be deactivated while cylinders 2, 3, 5, and 8 are activated, during a second engine cycle that immediately follows the first engine cycle, cylinders 2 and 5 may be activated while cylinders 1, 3, 4, and 6-8 are deactivated. Each cylinder includes variable intake valve operators 51 and variable exhaust valve operators 53. An engine cylinder may be deactivated by its variable intake valve operators 51 and variable exhaust valve operators holding intake and exhaust valves of the cylinder closed during an entire cycle of the cylinder. An engine cylinder may be activated by its variable intake valve operators 51 and variable exhaust valve operators 53 opening and closing intake and exhaust valves of the cylinder during a cycle of the cylinder. Engine 10 includes a first cylinder bank 204, which includes four cylinders 1, 2, 3, and 4. Engine 10 also includes a second cylinder bank 202, which includes four cylinders 5, 6, 7, and 8. Cylinders of each bank may be active or deactivated during a cycle of the engine.

Referring now to FIG. 2B, an example multi-cylinder engine that includes one cylinder banks is shown. The engine includes cylinders and associated components as shown in FIG. 1. Engine 10 includes four cylinders 210. Each of the four cylinders is numbered and the numbers of the cylinders are included within the cylinders. Fuel injectors 66 selectively supply fuel to each of the cylinders that are activated (e.g., combusting fuel during a cycle of the engine with intake and exhaust valves opening and closing during a cycle of the cylinder that is active). Cylinders 1-4 may be selectively deactivated (e.g., not combusting fuel during a cycle of the engine with intake and exhaust valves held closed over an entire cycle of the cylinder being deactivated) to improve engine fuel economy when less than the engine's full torque capacity is requested. For example, cylinders 2 and 3 (e.g., a fixed pattern of deactivated cylinders) may be deactivated during a plurality of engine cycles (e.g., two revolutions for a four stroke engine). During a different engine cycle, a second fixed pattern cylinders 1 and 4 may be deactivated over a plurality of engine cycles. Further, other patterns of cylinders may be selectively deactivated based on vehicle operating conditions. Additionally, engine cylinders may be deactivated such that a fixed pattern of cylinders is not deactivated over a plurality of engine cycles. Rather, cylinders that are deactivated may change from one engine cycle to the next engine cycle. For example, during a first engine cycle, cylinders 1 and 4 may be deactivated while cylinders 2 and 3 are activated, during a second engine cycle that immediately follows the first engine cycle, cylinders 1 and 4 may be activated while cylinders 2 and 3 are deactivated. In this way, the deactivated engine cylinders may rotate or change from one engine cycle to the next engine cycle.

Engine 10 includes a single cylinder bank 250, which includes four cylinders 1-4. Cylinders of the single bank may be active or deactivated during a cycle of the engine. Each cylinder includes variable intake valve operators 51 and variable exhaust valve operators 53. An engine cylinder may be deactivated by its variable intake valve operators 51 and variable exhaust valve operators holding intake and exhaust valves of the cylinder closed during a cycle of the cylinder. An engine cylinder may be activated by its variable intake valve operators 51 and variable exhaust valve operators 53 opening and closing intake and exhaust valves of the cylinder during a cycle of the cylinder.

The system of FIGS. 1-2B provides for an engine system, comprising: an engine including a cylinder, the cylinder including a variable lift and timing poppet valve; and a controller including executable instructions stored in non-transitory memory that cause the controller to deactivate the cylinder and adjust an amount of lift of the variable lift and timing poppet valve in response to a temperature of the engine. The system includes where the cylinder is deactivated via ceasing fuel to the cylinder. The system further comprises additional instructions to adjust an amount of lift of a variable lift and timing poppet value of a second cylinder in response to the temperature of the engine. The system includes where adjusting the amount of lift includes increasing the amount of lift. The system includes where adjusting the amount of lift includes decreasing the amount of lift. The system further comprises additional instructions to increase an opening amount of a throttle in response to the temperature of the engine. The system further comprises additional instructions to decrease an engine torque limit in response to the temperature of the engine.

Referring now to FIG. 3, plots of a prophetic engine operating sequence are shown. The plots are aligned in time and occur at the same time. The vertical lines at times t0-t2 represent times of interest during the operating sequence. The sequence may be provided by the system of FIGS. 1 and 2A according to the method of FIG. 4. In this example, driver demand torque (not shown) is held constant during the sequence for simplification purposes.

The first plot from the top of FIG. 3 is a plot of engine temperature verses time. The vertical axis represents engine temperature and engine temperature increases in the direction of the vertical axis arrow. The horizontal axis represents time and time increases in the direction of the horizontal axis arrow. Horizontal line 350 represents a threshold temperature above which one or more cylinders may be deactivated to reduce engine temperature. Trace 302 represents the engine temperature.

The second plot from the top of FIG. 3 is a plot of engine cylinder deactivation state versus time. The vertical axis represents the engine cylinder deactivation state and the cylinder deactivation state is asserted when trace 304 is at a level that is near the vertical axis arrow. The cylinder deactivation state is not asserted when trace 304 is at a level that is near the horizontal axis. One or more engine cylinders are deactivated when the cylinder deactivation state is asserted. The horizontal axis represents time and time increases in the direction of the horizontal axis arrow. Trace 304 represents the cylinder deactivation state.

The third plot from the top of FIG. 3 is a plot of valve lift of active engine cylinders versus time. The vertical axis represents the valve lift of active engine cylinders and the valve lift of active engine cylinders increases in the direction of the vertical axis arrow. The valve lift of active cylinders is zero when trace 306 is at a level of the horizontal axis. The horizontal axis represents time and time increases in the direction of the horizontal axis arrow. Trace 306 represents the active cylinder valve lift amount.

The fourth plot from the top of FIG. 3 is a plot of valve lift of deactivated engine cylinders versus time. The vertical axis represents the valve lift of deactivated engine cylinders and the valve lift of deactivated engine cylinders increases in the direction of the vertical axis arrow. The valve lift of deactivated cylinders is zero when trace 308 is at a level of the horizontal axis. The horizontal axis represents time and time increases in the direction of the horizontal axis arrow. Trace 308 represents the deactivated cylinder valve lift amount.

The fifth plot from the top of FIG. 3 is a plot of engine throttle position versus time. The vertical axis represents the engine throttle position and the throttle position increases (e.g., opens further) in the direction of the vertical axis arrow. The engine throttle valve position is fully closed when trace 310 is at a level of the horizontal axis. The horizontal axis represents time and time increases in the direction of the horizontal axis arrow. Trace 310 represents the engine throttle position.

The sixth plot from the top of FIG. 3 is a plot of an engine torque limit versus time. The vertical axis represents the engine torque limit (e.g., a torque that the engine is not permitted to exceed) and the engine torque limit increases in the direction of the vertical axis arrow. The horizontal axis represents time and time increases in the direction of the horizontal axis arrow. Trace 312 represents the engine torque limit.

At time t0, the engine temperature is below threshold 350 and it is increasing. The engine's cylinders are not deactivated and the valve lift of activated cylinders is at a middle level. The valve lift of deactivated cylinders is not indicated because cylinders are not deactivated. The engine throttle is open a middle level amount and the engine torque limit is a higher value.

At time t1, the engine temperature exceeds threshold 350 so one or more engine cylinders are deactivated. The cylinder deactivation state changes to an active level and the active cylinder valve lift is reduced. In addition, the throttle opening amount is increased and the valve lift of deactivated cylinders is now indicated at a middle level. The engine torque limit is reduced. The valves of the deactivated cylinders continue to open and close such that air is pumped through the deactivated cylinders causing the air to cool the engine. The cylinders are deactivated via ceasing fuel injection and spark to the deactivated cylinders. The lift of the active cylinders is decreased because the throttle opening amount is increased, which allows additional air to flow into the engine's intake manifold.

Between time t1 and time t2, the engine temperature continues to increase. The valve lift of deactivated cylinders increases as engine temperature increases so that additional cool air may flow through the engine, thereby cooling the engine. The engine torque limit is also decreased as the engine temperature increases so that the engine temperature rise may be limited. The valve lift of activated cylinders remains constant since the driver demand torque is constant in this example. The throttle opening amount also remains constant and engine cylinders are still deactivated.

At the time that is nearly in the middle of time t1 and time t2, the engine temperature begins to decrease. The engine temperature decrease may be attributed to air flow through the engine cooling the engine and/or coolant being allowed to flow through the engine (e.g., release of a temporarily stuck closed engine coolant thermostat). The valve lift of deactivated cylinders is reduced in response to the decreasing engine temperature and the engine torque limit is raised in response to the decreasing engine temperature. One or more engine cylinders continue to be deactivated.

At time t2, the engine temperature falls below threshold 350 so cylinders are no longer deactivated to cool the engine with air. The throttle is partially closed and the engine torque limit is increased. The valve lift of active engine cylinders is increased since the throttle opening amount is decreased and since the number of active cylinders is increased.

In this way, valve lift of deactivated cylinders may be adjusted as a function of engine temperature so that an engine may be cooled via flowing air through the engine while reducing the possibility of excessive air flow through the engine. Further, catalyst efficiency may be maintained via adjusting valve lift and/or timing as a function of engine temperature.

Referring now to FIG. 4, a flow chart of a method for operating an engine is shown. The method of FIG. 4 may be incorporated into and may cooperate with the system of FIGS. 1-2B. Further, at least portions of the method of FIG. 4 may be incorporated as executable instructions stored in non-transitory memory of a controller that cause the controller to perform specific actions. The controller may transform operating states of devices and actuators in the physical world to perform the method.

At 402, method 400 determines vehicle operating conditions. Vehicle operating conditions may include, but are not limited to engine temperature, driver demand torque, engine air flow amount, engine speed, and ambient air temperature. Method 400 may determine the various operating conditions via the sensors and actuators described herein. Method 400 proceeds to 404 after determining the vehicle operating conditions.

At 404, method 400 judges if engine temperature is greater than a threshold temperature. The engine temperature may be a temperature of a cylinder head, engine coolant temperature, engine oil temperature, or a different engine temperature. The threshold engine temperature may be a function of driver demand torque and engine speed. If method 400 judges that an engine temperature is greater than or equal to the threshold temperature, then the answer is yes and method 400 proceeds to 406. Otherwise, the answer is no and method 400 proceeds to 420.

At 420, method 400 operates engine popper valves (e.g., engine intake and exhaust poppet valves) at baseline lift amounts with baseline valve opening and closing timings. The baseline valve lift amounts and baseline valve opening and closing timings may be a function of driver demand torque and engine speed. Further, in vehicle systems that include an engine intake throttle, the throttle opening amount may be adjusted to a baseline opening amount that is a function of requested engine air flow according to driver demand torque and engine speed. The baseline valve lift amounts, baseline valve opening timings and closing timings, and throttle opening amount may be stored in controller memory and they may be retrieved via referencing one or more functions and/or tables via driver demand torque and engine speed while operating the engine. The baseline valve lift amounts, baseline valve opening timings and closing timings, and throttle opening amount may be empirically determined via operating the engine on a dynamometer. Method 400 proceeds to exit after adjusting the engine throttle, poppet valve lift, and poppet valve opening and closing timings (e.g., poppet valve opening and closings relative to crankshaft position) according to baseline opening amounts, lift amounts, and timing amounts.

At 406, method 400 adjusts an engine torque upper threshold limit (e.g., a threshold that engine torque is not permitted to exceed) as a function of engine temperature. In one example, the engine torque upper threshold limit is decreased as engine temperature increases. By reducing the engine torque upper threshold limit, engine torque may be constrained so that engine temperature may not increase to higher levels that may not be managed via flowing air through the engine. Method 400 proceeds to 408.

At 408, method 400 deactivates one or more engine cylinders in response to engine temperature being greater than a threshold temperature. The actual total number of deactivated cylinders, or alternatively, the actual total number of activated cylinders may be a function of the engine temperature. Further, method 400 may rotate the cylinders that are deactivated each engine cycle. For example, during a first cycle of an eight cylinder engine, cylinders 2, 3, 5, and 8 may be deactivated with intake and exhaust valves that continue to open and close while the cylinders are deactivated. Cylinders 1, 4, 6, and 7 remain active during the first engine cycle. During a second engine cycle immediately following the first engine cycle, cylinders 1, 4, 6, and 7 are deactivated with intake and exhaust valves that continue to open and close while cylinders 2, 3, 5, and 8 are active. In addition, the actual total number of cylinders that are deactivated may be based on the driver demand torque.

In one example, if the engine is an eight cylinder engine, method 400 may deactivate two engine cylinders via ceasing fuel flow to the two deactivated cylinders. The valves of these cylinders continue to operate to allow fresh air that has not participated in combustion to pass through the two deactivated cylinders, thereby air cooling the engine. If the driver demand torque is low, two additional cylinders may be deactivated via ceasing fuel flow to these two cylinders and by holding intake and exhaust valves of these cylinders in closed positions over an entire engine cycle. Thus, intake and exhaust poppet valves of two deactivated cylinders may continue to allow air flow through two deactivated cylinders and intake and exhaust poppet valves of two deactivated cylinders may be held closed over one or more engine cycles to conserve fuel. Four cylinders remain active in this example to meet and provide the driver demand torque. If the engine temperature continues to increase, then the intake and exhaust poppet valves of four deactivated cylinders may operate to allow additional an increased amount of air to flow though the engine without having participated in combustion within the engine. The engine may still continue to operate with four active cylinders if the driver demand torque remains low. However, if the engine temperature does not increase and driver demand torque increases to a level requiring more than four active cylinders, then the actual total number of activated cylinders (e.g., cylinders that are combusting air and fuel) may be increased to meet the driver demand torque while two cylinders remain deactivated with operating intake and exhaust valves.

In one example, method 400 references a first table or function that outputs an actual total number of engine cylinders to deactivate with operating intake and exhaust valves that allow air to flow through the deactivated cylinders according to engine temperature. Method 400 also accesses a second table or function that requests an actual total number of active cylinders, or alternatively, an actual total number of deactivated cylinders via driver demand torque and engine speed. The actual total number of deactivated engine cylinders that is based on engine temperature may have priority so that method 400 deactivates the actual total number of cylinders based on engine temperature. However, if the actual number of deactivated cylinders based on driver demand torque is greater than the actual total number of cylinder to deactivate based on engine temperature, then method 400 deactivates additional cylinders, but poppet valves of these additional cylinders may be held in a closed state during an engine cycle. Thus, method 400 may deactivate several cylinders and some of the deactivated cylinders may have intake and exhaust valves that open and close during an engine cycle while other deactivated cylinders have intake and exhaust valves that remain closed during the engine cycle. This may allow the engine to conserve fuel and maintain catalyst efficiency. Method 400 proceeds to 410 after engine cylinders have been deactivated according to engine temperature.

At 410, method 400 increases an engine throttle opening amount, if an engine throttle is present. By increasing the throttle opening amount, it may be possible to increase the amount of air flowing through the engine to increase engine cooling. Method 400 also adjusts an amount of valve lift for operating poppet valves of cylinders that are deactivated as a function of engine temperature. For example, method 400 may increase a valve lift amount of intake poppet valves for operating intake poppet valves of deactivated cylinders as engine temperature increases beyond a threshold temperature. For example, a lift amount of an intake poppet valve for an operating intake poppet valve of a deactivated cylinder may be increased from 6 millimeters to 7 millimeters when a threshold engine temperature is exceeded by 2° C. The intake poppet valve lift amount for the intake poppet valve may be increased to 8 millimeters when the threshold engine temperature is exceeded by 3° C. Method 400 may increase lift exhaust poppet valves that are operating in deactivated cylinders similarly as a function of engine temperature. The increased poppet valve lift may increase air flow through the engine, thereby increasing engine cooling.

Additionally, or alternatively, method 400 may adjust intake and/or exhaust poppet valve opening timing (relative to crankshaft position) and closing timing for deactivated cylinders as a function of engine temperature exceeding the threshold engine temperature. For example, intake and exhaust poppet valve timings may be adjusted so that air may have more time to flow into a deactivated cylinder during an intake stroke of the deactivated cylinder as engine temperature increases so that engine cooling may be increased via the increased air flow through the engine. Likewise, exhaust valve timings may be adjusted to allow a longer amount of time for air to pass through the cylinder and into the exhaust system so that engine air flow may be increased, thereby increasing engine cooling. In one example, intake valve timing may be advanced to increase air flow through the engine when engine temperature increases. In another example, intake valve timing may be retarded to increase air flow though the engine when engine temperature rises.

Method 400 may also increase intake poppet valve lift amounts for active engine cylinders (e.g., cylinders that are combusting air and fuel) as a function of driver demand torque and engine speed. In particular, method 400 may increase intake poppet valve lift as driver demand torque increases. Additionally, or alternatively, method 400 may adjust intake and/or exhaust poppet valve opening timings (relative to crankshaft position) and closing timings for active engine cylinders as a function of driver demand torque. For example, intake and exhaust poppet valve timing may be adjusted so that air may have more time to flow into an activated cylinder during an intake stroke of the activated cylinder as driver demand torque increases so that additional torque may be generated by the engine. Likewise, exhaust valve timing may be adjusted to allow a longer amount of time for exhaust gases to pass through the cylinder and into the exhaust system so that exhaust may be expelled from the cylinder, thereby increasing engine air flow. Method 400 proceeds to exit after adjusting poppet valve lift, poppet valve timing, and throttle opening amount.

Thus, the method of FIG. 4 provides for an engine control method, comprising: deactivating an engine cylinder in response to an engine temperature exceeding a threshold temperature; and adjusting an amount of lift of an intake valve of the engine cylinder in response to the engine temperature exceeding the threshold temperature. The method further comprises adjusting an opening or closing time of the intake valve in response to the engine temperature exceeding the threshold temperature. The method further comprises deactivating one or more additional engine cylinders in response to the engine temperature exceeding the threshold temperature. The method includes where the engine cylinder is deactivated via ceasing fuel flow to the cylinder. The method further comprises reducing an engine torque limit in response to the engine temperature exceeding the threshold temperature. The method further comprises delivering a driver demand torque via activated cylinders after deactivating the engine cylinder. The method further comprises deactivating cylinder deactivation in response to the actual total number of valve operator state changes being greater than a third threshold.

The method of FIG. 4 also provides for an engine control method, comprising: deactivating one or more cylinders of a plurality of cylinders of an engine in response to an engine temperature exceeding a threshold temperature; adjusting which of the plurality of cylinders is deactivated while the engine temperature exceeds the threshold temperature; and adjusting air flow through the deactivated one or more cylinders as a function of the engine temperature. The method includes where adjusting air flow though the deactivated one or more cylinders includes adjusting an amount of valve lift of intake valves of the deactivated one or more cylinders. The method includes where adjusting air flow though the deactivated one or more cylinders includes adjusting an opening or closing timing of intake valves of the deactivated one or more cylinders. The method includes where adjusting air flow through the deactivated one or more cylinders includes adjusting a position of a throttle. The method further comprises adjusting air flow through activated cylinders included in the plurality of cylinders based on a driver demand torque. The method includes where adjusting which of the plurality of cylinders is deactivated includes changing which of the plurality of cylinders is deactivated between two engine cycles.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. An engine control method, comprising:
    deactivating an engine cylinder of an engine in response to an engine temperature exceeding a threshold temperature; and
    adjusting an amount of lift of an intake valve of the engine cylinder while it is deactivated and flowing air through the engine cylinder while it is deactivated in response to the engine temperature exceeding the threshold temperature.

2. The method of claim 1, further comprising advancing an opening time of the intake valve in response to the engine temperature exceeding the threshold temperature.

3. The method of claim 1, further comprising deactivating one or more additional engine cylinders in response to the engine temperature exceeding the threshold temperature, and where adjusting the amount of lift of the intake valve includes increasing the amount of lift of the intake valve as the engine temperature increases while the engine cylinder is deactivated and decreasing the amount of lift of the intake valve as the engine temperature decreases while the engine cylinder is deactivated.

4. The method of claim 1, where the engine cylinder is deactivated via ceasing fuel flow to the engine cylinder, and further comprising decreasing an amount of lift of intake valves of activated cylinders of the engine and increasing an opening amount of an intake throttle of the engine in response to the engine temperature exceeding the threshold temperature.

5. The method of claim 1, further comprising reducing an engine torque limit in response to the engine temperature exceeding the threshold temperature.

6. The method of claim 1, further comprising delivering a driver demand torque via activated cylinders after deactivating the engine cylinder.

7. The method of claim 1, further comprising deactivating a second cylinder with intake valves of the second cylinder held closed during an engine cycle in response to the engine temperature exceeding the threshold temperature.

8. An engine system, comprising:
    an engine including a cylinder, the cylinder including a variable lift and timing poppet valve; and
    a controller including executable instructions stored in non-transitory memory that cause the controller to deactivate the cylinder and adjust an amount of lift of the variable lift and timing poppet valve to a non-zero lift amount that varies with a temperature of the engine, while the cylinder is deactivated, in response to the temperature of the engine exceeding a threshold temperature.

9. The system of claim 8, where the cylinder is deactivated via ceasing fuel to the cylinder.

10. The system of claim 8, further comprising additional instructions to adjust an amount of lift of a variable lift and timing poppet valve of a second cylinder in response to the temperature of the engine such that the amount of lift increases with increasing engine temperature.

11. The system of claim 10, where adjusting the amount of lift includes increasing the amount of lift of the variable lift and timing poppet valve.

12. The system of claim 10, where adjusting the amount of lift includes decreasing the amount of lift of the variable lift and timing poppet valve.

13. The system of claim 8, further comprising additional instructions to increase an opening amount of a throttle and decreasing an intake valve lift amount of an active cylinder in response to the temperature of the engine.

14. The system of claim 8, further comprising additional instructions to decrease an engine torque limit in response to the temperature of the engine.

15. An engine control method, comprising:
    deactivating one or more cylinders of a plurality of cylinders of an engine in response to an engine temperature exceeding a threshold temperature;
    adjusting which of the plurality of cylinders is deactivated while the engine temperature exceeds the threshold temperature; and
    adjusting air flow through the deactivated one or more cylinders as a function of the engine temperature via adjusting an amount of valve lift of intake valves of the deactivated one or more cylinders to a non-zero value.

16. The method of claim 15, where adjusting air flow through the deactivated one or more cylinders includes increasing the amount of valve lift of intake valves of the deactivated one or more cylinders as engine temperature increases.

17. The method of claim 15, where adjusting air flow through the deactivated one or more cylinders includes advancing an opening timing of intake valves of the deactivated one or more cylinders.

18. The method of claim 15, where adjusting air flow through the deactivated one or more cylinders includes adjusting a position of a throttle.

19. The method of claim 15, further comprising adjusting air flow through activated cylinders included in the plurality of cylinders based on a driver demand torque.

20. The method of claim 15, where adjusting which of the plurality of cylinders is deactivated includes changing which of the plurality of cylinders is deactivated between two engine cycles.

\* \* \* \* \*